H. C. STOUFFER.
Nut-Lock.

No. 202,603. Patented April 16, 1878.

Attest:
H. L. Perine
Floyd Norris.

Hiram C. Stouffer
Inventor.
By Johnson & Johnson
Atty's

UNITED STATES PATENT OFFICE.

HIRAM C. STOUFFER, OF CANFIELD, OHIO, ASSIGNOR OF ONE-HALF HIS RIGHT TO C. C. TROUT, OF SHARON, PENNSYLVANIA.

IMPROVEMENT IN NUT-LOCKS.

Specification forming part of Letters Patent No. 202,603, dated April 16, 1878; application filed November 8, 1877.

*To all whom it may concern:*

Be it known that I, HIRAM C. STOUFFER, of Canfield, in the county of Mahoning and State of Ohio, have invented certain new and useful Improvements in Lock-Nuts; and I do hereby declare that the following is a full, clear, and exact description thereof, which will enable others skilled in the art to which it appertains to make and use the same, reference being had to the accompanying drawings, and to letters of reference marked thereon, which form a part of this specification.

In my improved nut-lock I use a washer with a tooth or projection formed on the circumference of its opening as a means, in connection with a nut-forming lock, for locking the bolt and the nut together when the latter is screwed home. The tooth is made to bite upon the ridges of the bolt-threads by a side movement of the washer effected by the action of inclined surfaces upon the joining faces of the washer and the nut, as they are both turned together upon the bolt against the fish-plate or other part.

The tooth is formed on the wall of the washer-opening by an eccentric portion of said opening, and in such position, in relation to the inclines on the nut and washer, that in screwing up the nut the washer will be caused to move to one side by reason of the eccentricity of its opening, and force the tooth crosswise into the ridges of the bolt-threads in a manner to fasten the washer thereon, while the inclines are such as to lock the nut upon the washer, so that the rail-joint, when once bound, will be held fast and firmly supported.

Figure 1:
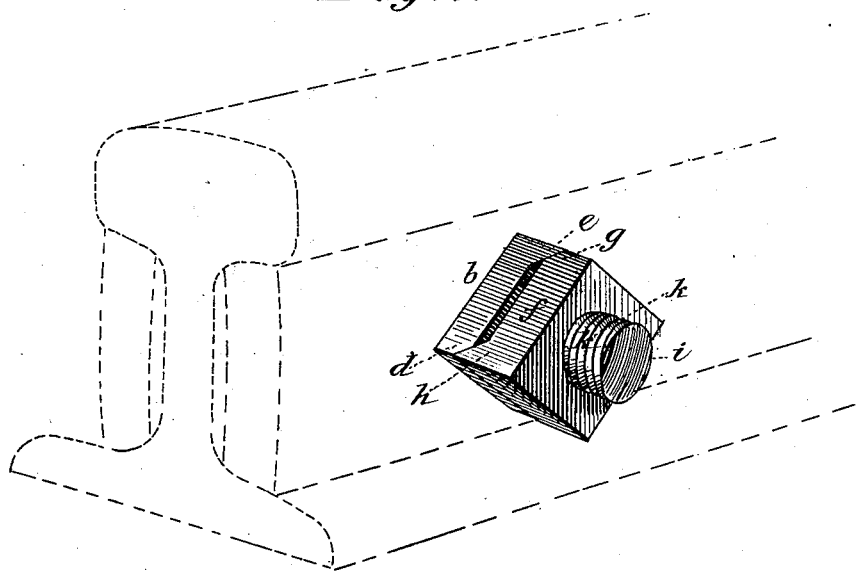
Figure 2:
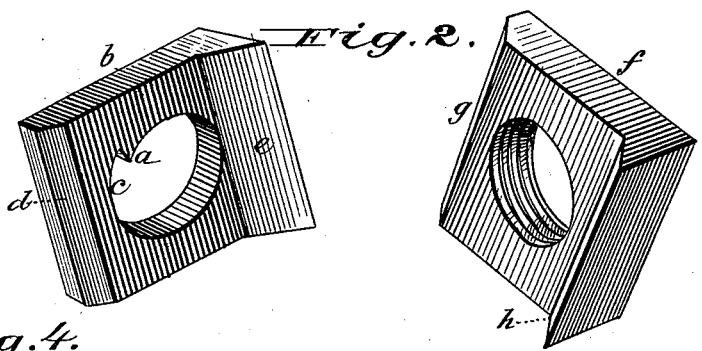
Figure 4:
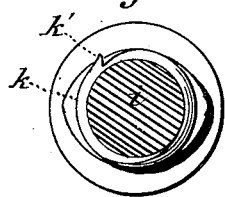
Figure 3:
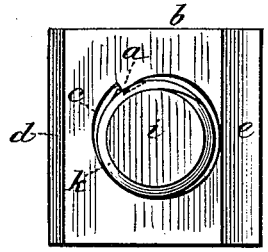

Referring to the drawings, Figure 1 represents a view, in perspective, of a nut-lock embracing my invention; Fig. 2, the toothed washer and the nut separated; Fig. 3, a section of the threaded end of the bolt, showing the tooth of the washer as biting into the ridges of the bolt-threads; and Fig. 4, a section of the bolt, showing the notch in the screw-thread formed by the washer-tooth.

I design the nut-lock more especially for rail-joints for supporting the fish-plates firmly against the rails; and my object is to obtain a device that will effectually lock both the nut and the washer upon the bolt.

A tooth, $a$, is formed upon the wall or circumference of the eye of the washer $b$ by forming a portion, $c$, of said eye eccentric, so that the junction of the concentric and eccentric portions terminates in said tooth, which is sharp edged in a line parallel with the axis of the bolt $i$. The eccentric portion of the eye of the washer serves also the function of allowing the washer to have a movement sidewise upon the bolt sufficient to cause the tooth to cut into the bolt-threads $k$, as shown at $k'$, Fig. 4, to insure its proper function. One end of the washer is beveled, as at $d$, and at its opposite end it has a projecting incline, $e$, parallel with the bevel.

The nut $f$ has a bevel, $g$, and a projecting incline, $h$, corresponding with those of the washer, and matching with the projecting incline of each upon the bevel of the other, all in the same inclined direction. The object of this construction is to effect the sidewise motion of the washer to lock its tooth with the bolt-threads, because, as the nut and washer are screwed up together against the fish-plate, their inclined parts bear upon each, and both being turned by the wrench so that the washer can move up no farther, then the nut, still moving up a little on the bolt, will, by the action of the inclines, and the freedom allowed by the eccentric opening, force the washer a little to one side, and bring its tooth hard upon the bolt-threads, so that it will cut into and across them a little, as at $k'$, and thus lock the washer on the bolt, while the inclines lock the nut upon the washer. By this construction all the parts will be so tightly bound together and fastened that they cannot become loose.

The bolt may have the usual holding-fin at the head, to prevent it from turning in the rail or other part.

The eccentric portion of the washer-eye must be arranged in such relation to the inclines as to cause the washer to be moved to one side on the bolt, in the direction of said inclines, the washer being simply forced to one side on the bolt by a wedge-action of the nut bearings.

The nut and the washer are of coincident form, and are turned together by the wrench.

I claim—

1. A nut-washer having a tooth on the wall of its opening, to be forced into and upon the threads of the bolt, to make a lock therewith, in combination with a nut forming a lock with the washer, as herein set forth.

2. The combination, with a washer having a tooth upon the wall of its opening, and inclined bearing-surfaces upon its face, of a nut having corresponding face-bearing surfaces, whereby the washer, bolt, and nut are locked together.

In testimony that I claim the foregoing I have affixed my signature in the presence of two witnesses.

HIRAM C. STOUFFER.

Witnesses:
  A. E. H. JOHNSON,
  J. W. HAMILTON JOHNSON.